United States Patent
Guan et al.

(10) Patent No.: US 12,271,802 B2
(45) Date of Patent: Apr. 8, 2025

(54) COMPUTING SYSTEM FOR IMPLEMENTING ARTIFICIAL NEURAL NETWORK MODELS AND METHOD FOR IMPLEMENTING ARTIFICIAL NEURAL NETWORK MODELS

(71) Applicant: Alibaba Damo (Hangzhou) Technology Co., Ltd., Zhejiang (CN)

(72) Inventors: Tianchan Guan, Shanghai (CN); Shengcheng Wang, Shanghai (CN); Dimin Niu, San Mateo, CA (US); Hongzhong Zheng, Los Gatos, CA (US)

(73) Assignee: ALIBABA DAMO (HANGZHOU) TECHNOLOGY CO., LTD., Hangzhou (CN)

( * ) Notice: Subject to any disclaimer, the term of this patent is extended or adjusted under 35 U.S.C. 154(b) by 364 days.

(21) Appl. No.: 17/698,648

(22) Filed: Mar. 18, 2022

(65) Prior Publication Data

US 2023/0153570 A1   May 18, 2023

(30) Foreign Application Priority Data

Nov. 15, 2021   (CN) .......................... 202111345697.2

(51) Int. Cl.
G06K 9/00 (2022.01)
G06N 3/04 (2023.01)
(Continued)

(52) U.S. Cl.
CPC ............ *G06N 3/04* (2013.01); *G06V 10/7715* (2022.01); *G06V 10/82* (2022.01); *G06V 10/955* (2022.01)

(58) Field of Classification Search
CPC ...... G06N 3/04; G06V 10/7715; G06V 10/82; G06V 10/955
See application file for complete search history.

(56) References Cited

U.S. PATENT DOCUMENTS 11,113,601 B1 *  9/2021  Xiao ................... G06N 3/082
11,763,155 B2 *  9/2023  Gurumurthi ........... G06V 10/56
                                                          706/15
(Continued)

FOREIGN PATENT DOCUMENTS

CN    108804996 A  * 11/2018  ......... G06K 9/00268
CN    110689115 A  *  1/2020  .............. G06N 3/04
(Continued)

OTHER PUBLICATIONS

In-Memory Data Parallel Processor, Daichi Fujiki et al, Asplos, 2018, pp. 1-14 (Year: 2018).*

(Continued)

*Primary Examiner* — Jayesh A Patel
(74) *Attorney, Agent, or Firm* — Finnegan, Henderson, Farabow, Garrett & Dunner, LLP (57) ABSTRACT

The present application discloses a computing system for implementing an artificial neural network model. The artificial neural network model has a structure of multiple layers. The computing system comprises a first processing unit, a second processing unit, and a third processing unit. The first processing unit performs computations of the first layer based on a first part of input data of the first layer to generate a first part of output data. The second processing unit performs computations of the first layer based on a second part of the input data of the first layer so as to generate a second part of the output data. The third processing unit performs computations of the second layer based on the first part and the second part of the output data. The first processing unit, the second processing unit, and the third processing unit have the same structure.

20 Claims, 9 Drawing Sheets (51) Int. Cl.
*G06V 10/77* (2022.01)
*G06V 10/82* (2022.01)
*G06V 10/94* (2022.01)

(56) References Cited

U.S. PATENT DOCUMENTS

| | | | | |
|---|---|---|---|---|
| 2018/0129937 | A1* | 5/2018 | Bradbury | G06N 3/044 |
| 2018/0130203 | A1* | 5/2018 | Abedini | G06T 7/0012 |
| 2020/0160494 | A1* | 5/2020 | Hwang | G06N 3/045 |
| 2020/0184321 | A1* | 6/2020 | Fulop | G06V 10/82 |
| 2020/0310761 | A1* | 10/2020 | Rossi | H03M 7/18 |
| 2021/0049446 | A1* | 2/2021 | Gurumurthi | G06V 10/56 |
| 2021/0390367 | A1* | 12/2021 | Liu | G06F 9/30105 |
| 2022/0092424 | A1* | 3/2022 | Almazán Manzanares | G06N 3/08 |
| 2022/0164137 | A1* | 5/2022 | Bhargava | G06F 3/0659 |
| 2022/0164663 | A1* | 5/2022 | Liu | G06N 3/084 |
| 2022/0188608 | A1* | 6/2022 | Heinrich | G06N 3/063 |
| 2022/0236909 | A1* | 7/2022 | Hua | G06F 3/0604 |
| 2023/0023241 | A1* | 1/2023 | Tabuchi | G06N 3/047 |
| 2023/0077258 | A1* | 3/2023 | Shen | G06N 3/082 |
| 2023/0103312 | A1* | 4/2023 | Liu | G06F 17/16 708/520 |

FOREIGN PATENT DOCUMENTS

| | | | | |
|---|---|---|---|---|
| CN | 111242282 | A * | 6/2020 | G06N 3/0454 |
| CN | 113261015 | A * | 8/2021 | G06N 3/045 |
| CN | 113597621 | A * | 11/2021 | |
| EP | 3588441 | A1 * | 1/2020 | G06F 18/2433 |
| WO | WO-2021218786 | A1 * | 11/2021 | G06N 3/08 |

OTHER PUBLICATIONS

Modeling and prediction with a class of time delay dynamic neural networks, Yasar Becerikli et al., Elsevier, 2017, pp. 1164-1169 (Year: 2017).*

A time delay neural network architecture for efficient modeling of long temporal contexts, Vijayaditya Peddinti et al., Interspeec, 2015, pp. 3214-3218 (Year: 2015).*

Traffic signal violation detection using artificial intelligence and deep learning, Ruben J Franklin et al., ICCES, 2020, pp. 839-844 (Year: 2020).*

Paleo: a Performance Model for Deep Neural Networks, Hang Qi et al., ICLR, 2017, pp. 1-10 (Year: 2017).*

Efficient Hardware Architectures for Deep Convolutional Neural Network, Jichen Wang et al., IEEE, 2018, pp. 1941-1953 (Year: 2018).*

L. Song, X. Qian, H. Li and Y. Chen, "PipeLayer: A Pipelined ReRAM-Based Accelerator for Deep Learning," 2017 IEEE International Symposium on High Performance Computer Architecture (HPCA), Feb. 2017.

* cited by examiner

COMPUTING SYSTEM FOR IMPLEMENTING ARTIFICIAL NEURAL NETWORK MODELS AND METHOD FOR IMPLEMENTING ARTIFICIAL NEURAL NETWORK MODELS

CROSS-REFERENCE TO RELATED APPLICATIONS

This application claims priority of China application No. 202111345697.2, filed on Nov. 15, 2021, which is incorporated by reference in its entirety.

TECHNICAL FIELD

The present application relates to a computing system, particularly to a computing system for implementing an artificial neural network model.

BACKGROUND

Neural networks, also known as artificial neural networks, are mathematical models that mimic the structure and function of biological neural networks and are often applied in the fields of artificial intelligence and artificial perception. Generally speaking, a basic neural network has different input layers and output layers for performing different computations, and the results of the computations in the input layer are sent to the output layer for use as the data needed for the computations in the output layer. However, as applications are getting more and more complex, neural networks with more layers are developed, such as one or more hidden layers between the input layer and output layer, thereby forming a deep neural network.

Since the loading of computations and complexity of operations may vary for each layer in a deep neural network model, how to efficiently implement the large number of computations required for a deep neural network model on hardware has become an issue to be solved in the related field.

SUMMARY OF THE INVENTION

One embodiment of the present disclosure provides a computing system for implementing an artificial neural network model. The artificial neural network model has a structure of multiple layers, and output data of a first layer of the multiple layers structure is used as data required for computations of a second layer. The computing system includes a first processing unit, a second processing unit and a third processing unit, and the computing system is used to arrange the first processing unit, the second processing unit and the third processing unit to improve the performance and/or hardware utilization of the computing system when running the artificial neural network model. The first processing unit is configured to perform computing operations of the first layer based on a first part of input data of the first layer to generate a first part of the output data. The second processing unit is configured to perform computing operations of the first layer based on a second part of the input data of the first layer to generate a second part of the output data. The third processing unit is configured to perform computing operations of the second layer based on the first part and the second part of the output data. The first processing unit, the second processing unit and the third processing unit have the same structure.

Another embodiment of the present disclosure provides a method for implementing an artificial neural network model, wherein the artificial neural network model has a structure of multiple layers, and output data of a first layer of the multiple layers structure is used as data required for the computations of a second layer. The method includes: in an initial simulation process, arranging a plurality of processing units based on an initial arrangement to implement the artificial neural network model, wherein for the plurality of processing units in the initial arrangement, each processing unit individually performs computation of at least one corresponding layer of the artificial neural network model; recording a computation delay time of each processing unit in the initial simulation process; determining a quantity of processing units that each layer of the artificial neural network model uses in a first optimized arrangement at least based on the computation delay time of each processing unit in the initial simulation process, to improve at least one of the performance and hardware utilization when running the artificial neural network model; and in a first optimization simulation process, arranging a plurality of processing units in the first optimized arrangement to implement the artificial neural network model.

The computing system and method for implementing an artificial neural network model provided by embodiments of the present disclosure can use a plurality of processing units jointly to process the computations of the same layer in the artificial neural network model or use a single processing unit to individually process the computations of multiple layers, so that the pipelining design can be more flexible, and that the computation load of each processing unit is more even, thereby improving the performance of running the artificial neural network model.

DETAILED DESCRIPTION

The following disclosure provides various different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "generally" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "generally." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

Artificial neural networks are often used in applications that used to require empirical judgment by the human brain, such as information retrieval, speech technology, natural language processing, deep learning, image content analysis, or video content analysis, due to their learning and fault tolerance capabilities. Artificial neural networks can typically include multiple layers, wherein the computations of each layer may correspond to the same or different types of computing operations, and the computation results of each layer are sent to the next layer for the computations of the next layer. In addition, depending on the application, users may use different artificial neural network models, such as convolutional neural network models and recurrent neural network models, and different artificial neural network models may include different computing operations.

Figure 1:
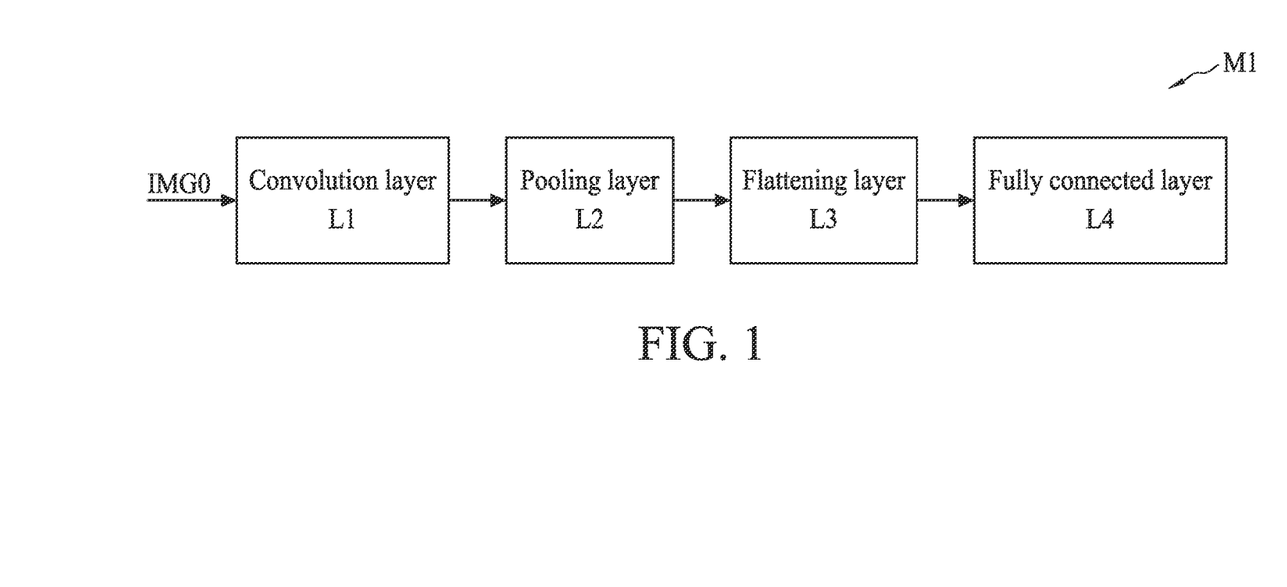
FIG. 1 is a schematic diagram illustrating the layers of a convolutional neural network model for use in image recognition.

FIG. 1 is a schematic diagram illustrating the layers of a convolutional neural network model M1 for use in image recognition. As shown in FIG. 1, the convolutional neural network model M1 may include a convolution layer L1 for performing convolutional computation on input image IMG0 to extract features, a pooling layer L2 for sampling features, a flat layer L3 for converting feature dimensions, and a fully connected layer L4 for classification. It is important to note that although the convolutional neural network model M1 is represented by only one convolutional layer L1 in FIG. 1, however, some other convolutional neural network models may include more layers, such as multiple convolutional layers and multiple pooling layers. For example, the object detection algorithm YOLO (You Only Live Once), proposed by Joseph Redmon et al. in 2015, and the subsequent compressed version Tiny-YOLO include convolutional computations of multiple layers.

Since in artificial neural network models, the computation results of each layer are outputted to the next layer as the input data required for computation of the next layer, the mechanism of Layer Wise Pipeline (LWP) can be used for hardware configuration when using hardware to implement artificial neural network models.

Figure 2:
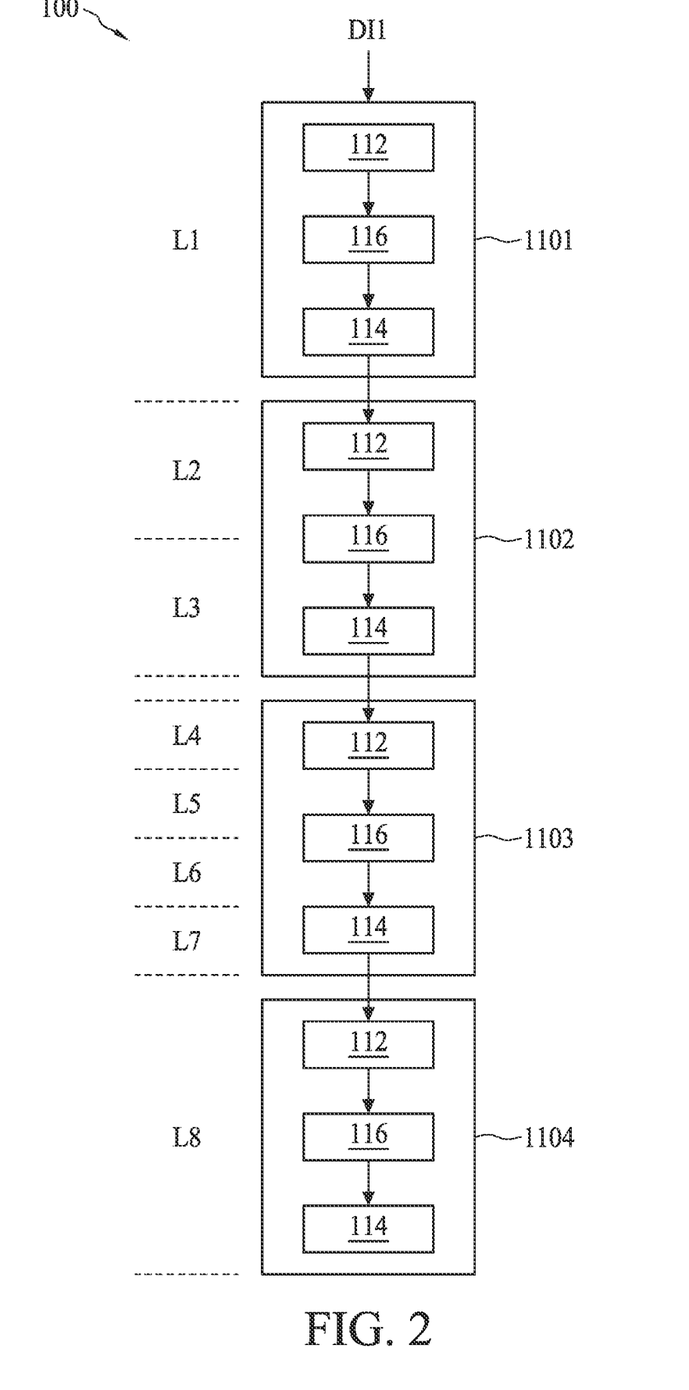
FIG. 2 is a schematic diagram illustrating a computing system configured to implement an artificial neural network model according to one embodiment of the present disclosure.

FIG. 2 is a schematic diagram illustrating a computing system 100 configured to implement an artificial neural network model. In FIG. 2, the computing system 100 may include a plurality of processing units 1101 to 1104, and each of the processing units 1101 to 1104 may include a receiving module 112, a transmitting module 114 and a computation module 116. The receiving module 112 may be configured to receive input data, the computation module 116 may perform computing operations based on the input data to generate output data, and the transmitting module 114 may output the output data to the next processing unit.

In FIG. 2, the transmitting module 114 of the processing unit 1101 is coupled to the receiving module 112 of the processing unit 1102, the transmitting module 114 of the processing unit 1102 is coupled to the receiving module 112 of the processing unit 1103, and the transmitting module 114 of the processing unit 1103 is coupled to the receiving module 112 of the processing unit 1104. In such case, the processing units 1101 to 1104 can be configured based on the Layer Wise Pipeline mechanism. That is, each of the processing units 1101 to 1104 may be configured to individually perform computation on at least one corresponding layer in the artificial neural network model.

In the present embodiment, the computing system 100 may be configured to implement an artificial neural network model having a structure of eight layers, such as, but not limited to, the eight-layer convolution computation in Tiny-YOLO. As shown in FIG. 2, the processing unit 1101 may be configured to process the computations of the first layer L1 in the artificial neural network model, the processing unit 1102 may be configured to process the computations of the second layer L2 and the third layer L3 in the artificial neural network model, the processing unit 1103 may be configured to process the computations of the fourth layer L4 to the seventh layer L7 in the artificial neural network model, and the processing unit 1104 may be configured to process the computations of the eighth layer L8 of the artificial neural network model.

Further, the receiving module 112, the transmitting module 114 and the computation module 116 of each of the processing units 1101 to 1104 can also be operated using the pipelining approach. For example, while the computation module 116 of the processing unit 1101 computes first input data DI1 previously received by the receiving module 112, the receiving module 112 of the processing unit 1101 can receive a second input data DI2 at the same time. Also, while the transmitting module 114 of the processing unit 1101 transmits the computation result of the computation module 116 to the receiving module 112 of the processing unit 1102, the computation module 116 of the processing unit 1101 may perform computation based on the second input data DI2 at the same time. Consequently, the pipelining operation can be used to improve the performance of the computing system 100.

Figure 3:
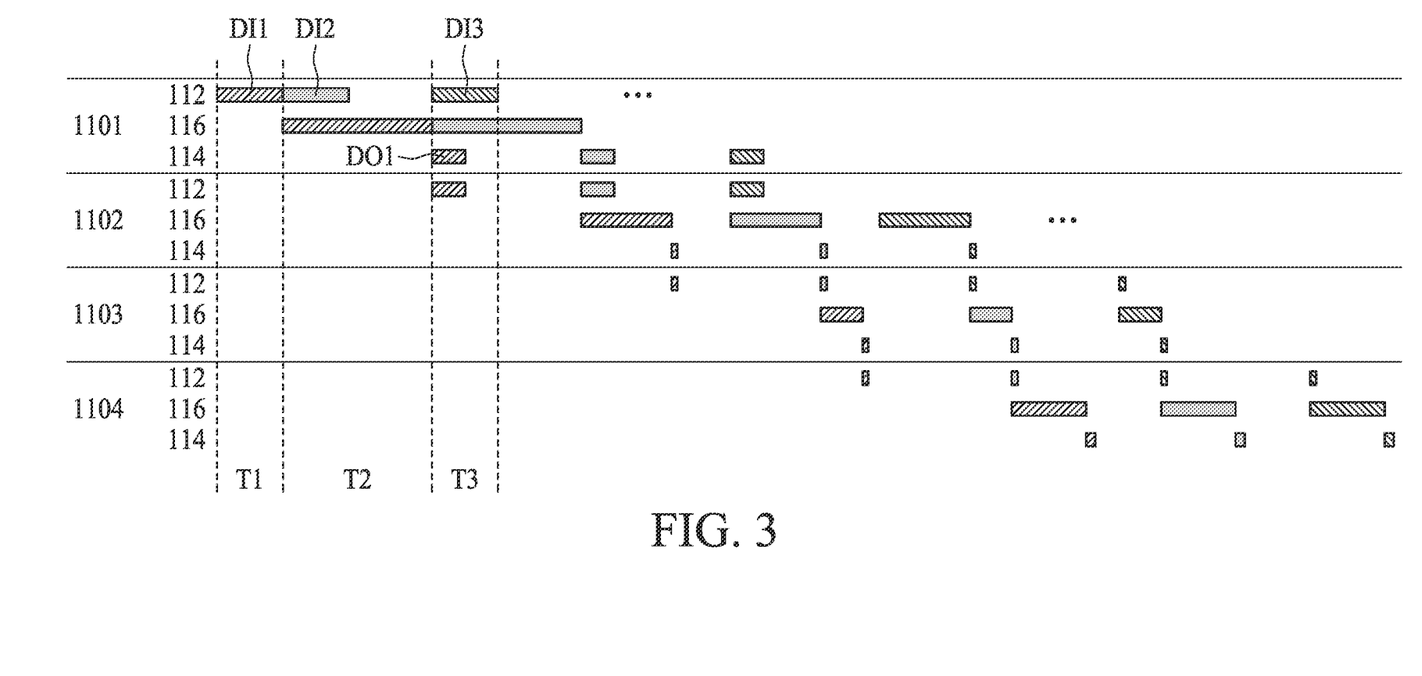
FIG. 3 is a data scheduling diagram of a plurality of processing units in FIG. 2.

FIG. 3 is a data scheduling diagram of the processing units 1101 to 1104 in FIG. 2. As shown in FIG. 3, in the processing units 1101 to 1104, the receiving module 112, the transmitting module 114 and the computation module 116 can also operate in a pipeline mechanism. For example, in the first period T1 of FIG. 3, the receiving module 112 of the processing unit 1101 may receive the first input data DI1. Then in the second period T2, the computation module 116 of the processing unit 1101 may perform computation on based on the first input data DI1 just received, and at the same time, the receiving module 112 of the processing unit 1101 may further receive the second input data DI2. In the third period T3, the transmitting module 114 of the processing unit 1101 may output an output data DO1 computed based on the first input data DI1 to the receiving module 112 of the processing unit 1102, and at the same time, the computation module 116 of the processing unit 1101 may further perform computation based on the second input data DI2, and the receiving module 112 of the processing unit 1101 may further receive the third input data DI3.

Although the computing system 100 uses the Layer Wise Pipeline mechanism to accelerate the computations of the artificial neural network model, the Layer Wise Pipeline mechanism also results in the processing units that are used to process the later layers of computation (such as processing unit 1104) having to wait longer to receive the corresponding input data and start the computation, causing low overall hardware utilization. In addition, because the computing operations included in each layer may be different and the overall complexity of their computation may be different, it may result in uneven utilization efficiency of processing units 1101 to 1104. In FIG. 3, for example, the time required for the computations of processing unit 1101 is significantly greater than the time required for the computations of the other processing units. In such case, the inefficient utilization of some of the processing units and the long waiting time make the performance of running the artificial neural network mode lower than expectation.

Figure 4:
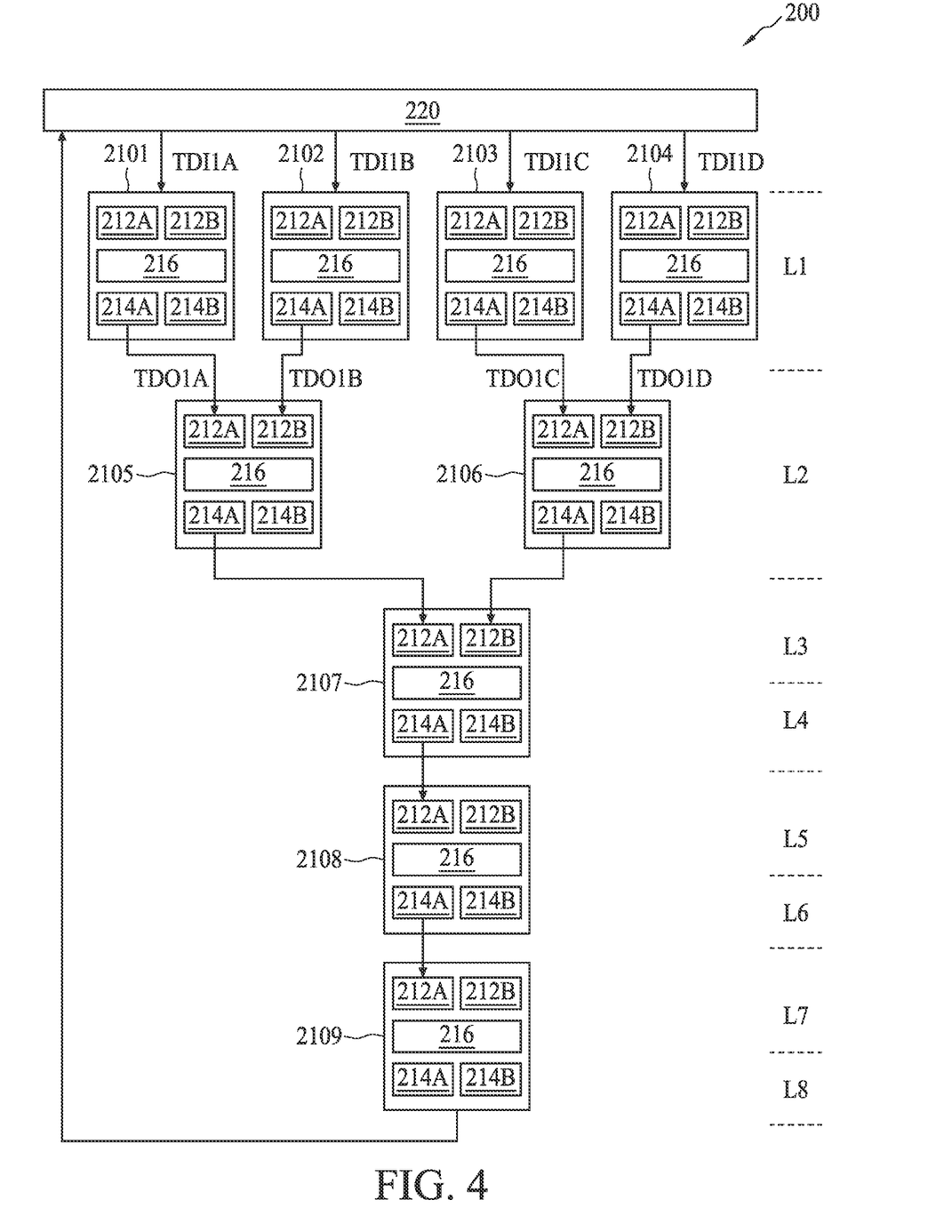
FIG. 4 is a schematic diagram illustrating a computing system according to another embodiment of the present disclosure.

To further enhance the performance of running an artificial neural network model, the computing system may allocate multiple processing units to process computations of one certain layer that requires computationally time-consuming operations. FIG. 4 is a schematic diagram illustrating a computing system 200 according to another embodiment of the present disclosure. The computing system 200 includes structurally identical processing units 2101 to 2109.

In the present embodiment, the computing system 200 may include the same eight-layer artificial neural network model that the computing system 100 uses, such as, but not limited to, the eight-layer computation of Tiny-Yolo. In FIG. 4, the processing units 2101 to 2104 are jointly used to process the computations of the first layer L1 of the artificial neural network model, the processing units 2105 and 2106 are jointly used to process the computations of the second layer L2 of the artificial neural network model, the processing unit 2107 is used to process the computations of the third layer L3 and the fourth layer of the artificial neural network model, the processing unit 2108 is used to process the computations of the fifth layer L5 to the seventh layer L7 of the artificial neural network model, and the processing unit 2109 is used to process the computations of the eighth layer L8 of the artificial neural network model.

Figure 5:
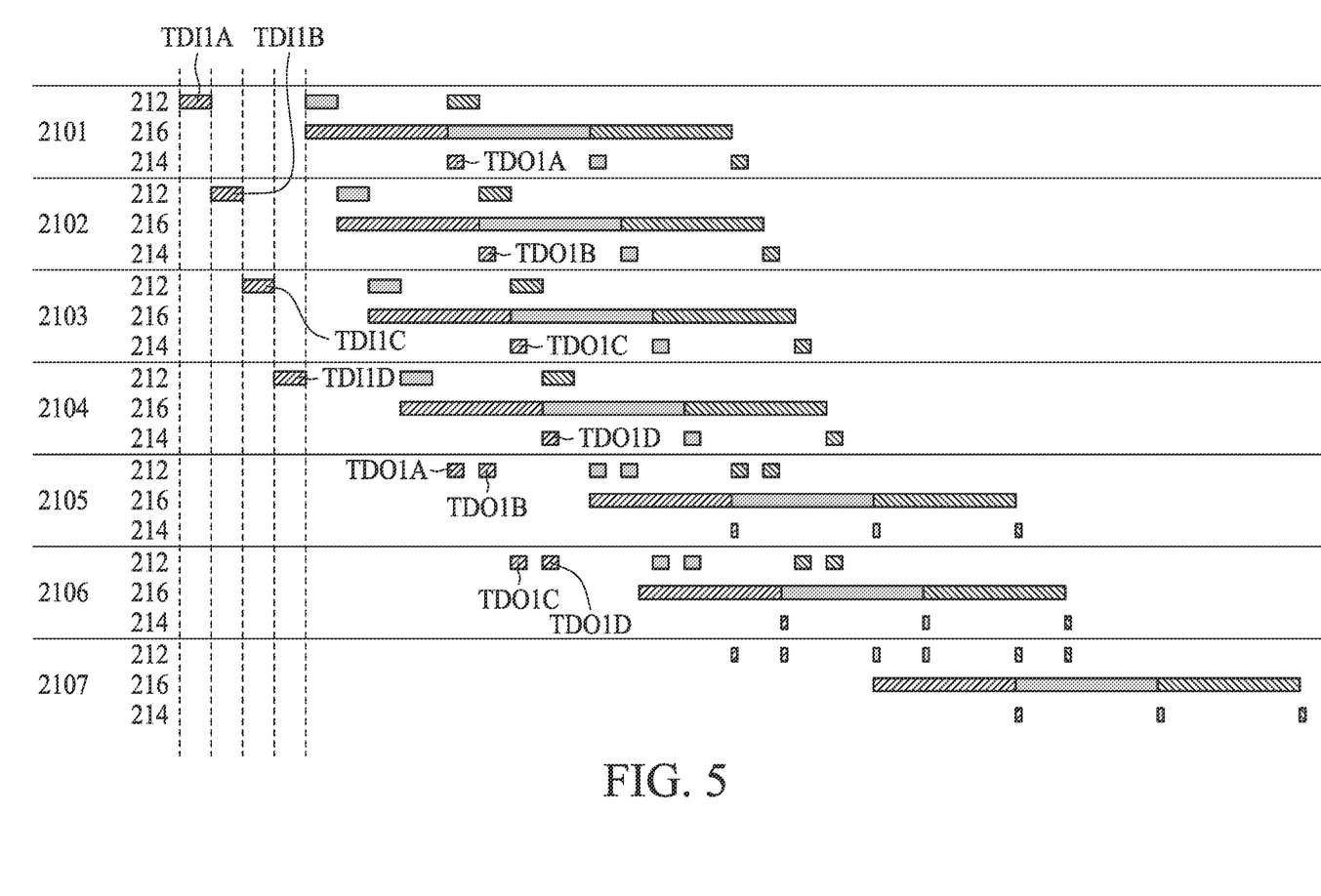
FIG. 5 is a data scheduling diagram of a plurality of processing units in FIG. 4.

FIG. 5 is a data scheduling diagram of the processing units 2101 to 2107 in FIG. 4. In FIG. 5, the processing units 2101 to 2104 may respectively receive the first part TDI1A, the second part TDI1B, the third part TDI1C and the fourth part TDI1D of the input data DI1 of the first layer L1. The processing unit 2101 may perform the computing operations of the first layer L1 based on the first part TDI1A of the input data DI1 to generate the first part TDO1A of the output data DO1 of the first layer L1, the processing unit 2102 may perform computing operations of the first layer L1 based on the second part TDI1B of the input data DI1 to generate the second part TDO1B of the output data DO1, the processing unit 2103 may perform the computing operations of the first layer L1 based on the third part TDI1C of the input data DI1 to generate the third part TDO1C of the output data DO1, and the processing unit 2104 may perform the computing operations of the first layer L1 based on the fourth part TDI1D of the input data DI1 to generate the fourth part TDO1D of the output data DO1. In the present embodiment, the processing units 2101, 2102, 2103 and 2104 may perform substantially the same computing operations based on different parts of the input data DI1. For example, the processing units 2101, 2102, 2103 and 2104 may use may use convolution kernels with the same weight values to perform the operations required for the first layer L1 convolutional computation on the respective received data.

After the processing units 2101 and 2102 generate the first part TDO1A and the second part TDO1B of the output data DO1, the processing units 2101 and 2102 may respectively output the first part TDO1A and the second part TDO1B of the output data DO1 to the processing unit 2105, and the processing unit 2105 will perform computing operations of the second layer L2 based on the first part TDO1A and the second part TDO1B of the output data DO1. Similarly, after the processing units 2103 and 2104 generate the third part TDO1C and the fourth part TDO1D of the output data DO1, the processing units 2103 and 2104 may respectively output the third part TDO1C and the fourth part TDO1D of the output data DO1 to the processing unit 2106, and the processing unit 2106 will perform computing operations of the second layer L2 based on the third part TDO1C and the fourth part TDO1D of the output data DO1.

After the processing units 2105 and 2106 respectively complete the corresponding computing operations of the second layer L2 based on corresponding parts of the output data DO1, they may respectively output the thus-generated computation result to the processing unit 2107 such that the processing unit 2107 may further complete the computations of the third layer L3 and the fourth layer L4. Next, for parts not shown in FIG. 5, the processing unit 2107 may output the computation results to the processing unit 2108 to complete the computations of the fifth layer L5 to the seventh layer L7, and then finally the processing unit 2109 completes the computations of the eighth layer L8.

As shown in FIG. 5, since the processing units 2101 to 2104 may jointly process the computations of the first layer L1, and the processing units 2105 and 2106 may jointly process the computations of the second layer L2, the computing system 200 is able to complete the computations of the first layer L1 and the second layer L2, such that the processing units configured to process the computations of the later layers (such as, the processing units 2107 to 2109) are able to receive corresponding data and start performing computation as early as possible. Further, the computations of the first layer having a higher complexity are allocated to a plurality of processing units for processing, and the computations of a plurality of layers having lower complexities are processed by a single processing unit, thereby further making the computation load of each stage of the pipelining computation becomes more even, which consequently increases the performance of the computing system 200 when running the artificial neural network model. In the present embodiment, the computing system 200 may arrange the processing units 2101 to 2109 such that a plurality of processing units of the processing units 2101 to 2109 jointly process the computations of a single layer and/or a single processing unit of the processing units 2101 to 2109 processes the computations of at least one layer, thereby increasing the performance and/or hardware utilization when running the artificial neural network model. For example, in some embodiments, processing units 2101 to 2109 may be configured with a priority to increase operational performance if the user has a strong demand for computation performance, or in some other embodiments, processing units 2101 to 2109 may be configured with a priority to increase hardware utilization if the user has a strong need for hardware utilization. However, the present disclosure does not limit the computing system 200 to a single consideration of improving operational performance or improving hardware utilization. In some embodiments, the computing system 200 may also balance hardware utilization and operational performance by appropriately configuring the internal processing units.

In the embodiment of FIG. 2, the computing system 200 may also include a host processing unit 220. The host processing unit 220 may be provided in a field-programmable logic gate array (FPGA) and may generate the input data DI1 of the first layer L1 based on the input file F1 of the artificial neural network model, and split the input data DI1 into four parts TDI1A, TDI1B, TDI1C, and TDI1D, which are then received by the processing units 2101 to 2104 and used accordingly to perform the computing operations required for the first layer L1. In addition, in FIG. 2, the output data generated by the processing unit 2109 after performing the computations of the eighth layer L8 can also be transmitted to the host processing unit 220 for subsequent processing and output.

In the case of a convolutional neural network model, the input file F1 may include, for example, an image to be recognized, and the host processing unit 220 may perform a convolutional computation based on the input file F1 to generate a feature map of the image, and partition the feature map into four different blocks as four parts TDI1A, TDI1B, TDI1C, and TDI1D of the input data DI1. However, the present disclosure is not limited to the application of the convolutional neural network model; in some other embodiments, depending on the application area, the input files of the artificial neural network model may be different types of files, and the host processing unit 220 may calculate and partition the input data of the first layer into a desired number of blocks or segments according to the characteristics of the input files so that these blocks are computed by multiple processing units. For example, in some other embodiments, the computing system may partition the input data into five or six segments and assign five or six processing units to jointly process the computations of the first layer L1.

Further, in the computing system 200, in order for a plurality of processing units to jointly process the computations of the single layer, each of the processing units 2101 to 2109 may include a plurality of receiving modules and a plurality of transmitting modules. For example, as shown in FIG. 2, each of the processing units 2101 to 2109 may include two receiving modules 212A and 212B, and two transmitting modules 214A and 214B. In such case, the receiving module 212A of the processing unit 2105 may be coupled to the transmitting module 214A of the processing unit 2101, and the receiving module 212B of the processing unit 2105 may be coupled to the transmitting module 214A of the processing unit 2102. The receiving module 212A of the processing unit 2106 may be coupled to the transmitting module 214A of the processing unit 2103, and the receiving module 212B of the processing unit 2106 may be coupled to the transmitting module 214A of the processing unit 2104. In this way, after the processing units 2101 and 2102 generate the first part TDO1A and the second part TDO1B of the output data DO1, the processing units 2101 and 2102 may then use their respective transmitting module 214A to output the first part TDO1A and the second part TDO1B of the output data DO1 to the receiving modules 212A and 212B of the processing unit 2105, and after the processing units 2103 and 2104 generate the third part TDO1C and the fourth part TDO1D of the output data DO1, the processing units 2103 and 2104 may then use their respective transmitting module 214A to output the third part TDO1C and the fourth part TDO1D of the output data DO1 to the receiving modules 212A and 212B of the processing unit 2106.

In the present embodiment, the computing system 200 uses the processing units 2101 to 2104 to process the computations of the first layer L1, uses the processing units 2105 and 2106 to process the computations of the second layer L2, uses the processing unit 2107 to process the computations of the third layer L3 and the fourth layer L4, uses the processing unit 2108 to process the computations of the fifth layer L5 to the seventh layer L7, and uses the processing unit 2109 to process the computations of the eighth layer L8; however, the present disclosure is not limited thereto. In some other embodiments, the computing system 200 may also configure the processing units 2101 through 2109 to perform the computations of the layers in other ways, depending on the characteristics of the artificial neural network model desired to be implemented, For example, in some embodiments, if the loading of the computations of the second layer in the artificial neural network model is greater, then it is feasible to use the processing unit 2101 to process the computations of the first layer, partition the output data of the first layer into parts, and transmit different parts of the output data to two other processing units via transmitting modules 214A and 214B of the processing unit 2101 to jointly process the computations of the second layer.

In some embodiments, in order to allow the computing system 200 to provide a greater variety of configurations to support the artificial neural network model used, each of the processing units 2101 to 2109 may also include a greater number of receiving modules and transmitting modules. However, to avoid using too many receiving modules and/or transmitting modules for processing units 2101 to 2109 and thereby increasing the overall circuitry area required, in some other embodiments, each of the processing units 2101 to 2109 may also enable the receiving modules to receive different data at different times via multiplexers.

Figure 6:
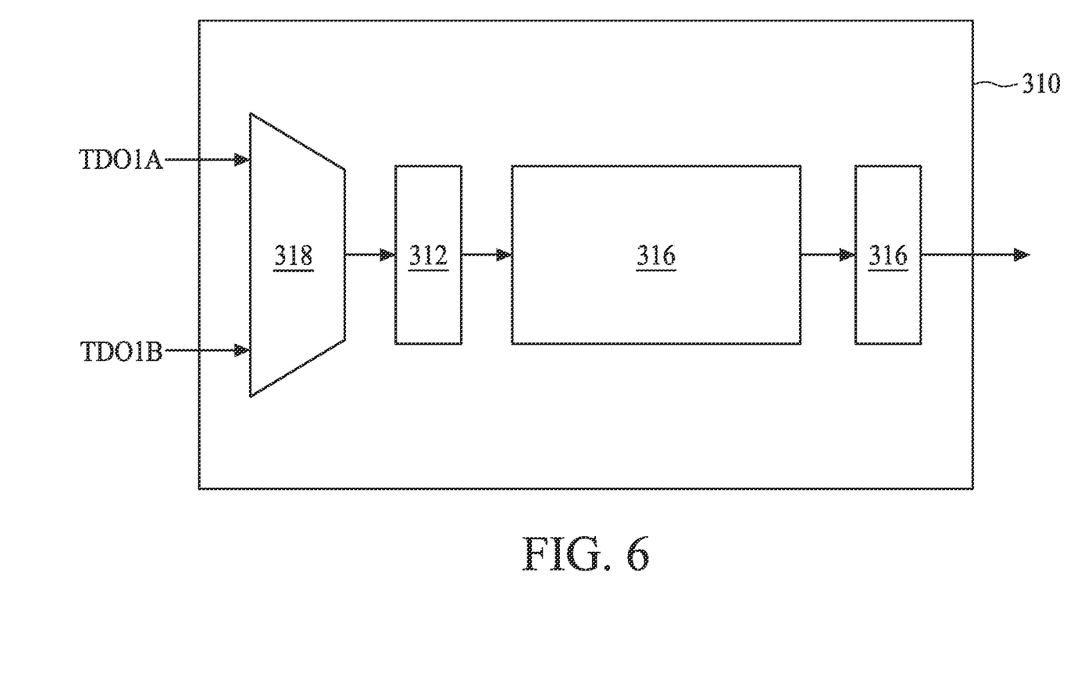
FIG. 6 is a schematic diagram illustrating a processing unit according to another embodiment of the present disclosure.

FIG. 6 is a schematic diagram illustrating a processing unit 310 according to another embodiment of the present disclosure. In FIG. 6, the processing unit 310 may include a receiving module 312, a transmitting module 314, a computation module 316 and a multiplexer 318. The processing unit 310 may be configured to replace the processing units 2101 to 2109 in the computing system 200. For example, when it is desired to use the processing unit 310 to replace the processing unit 2105, the multiplexer 318 of the processing unit 310 may be coupled to the transmitting modules of the processing units 2101 and 2102. In such case, the multiplexer 318 may, in a first period, transmit the first part TDO1A of the output data DO1 to the receiving module 312 of the processing unit 310, and in a second period different from the first period, transmit the second part TDO1B of the output data DO1 to the receiving module 312 of the processing unit 310. In this way, the processing unit 310 is able to use a single receiving module 312 to receive data transmitted from multiple processing units at different time via the multiplexer 318, thereby simplifying the hardware requirement of the processing unit 310.

Figure 7:
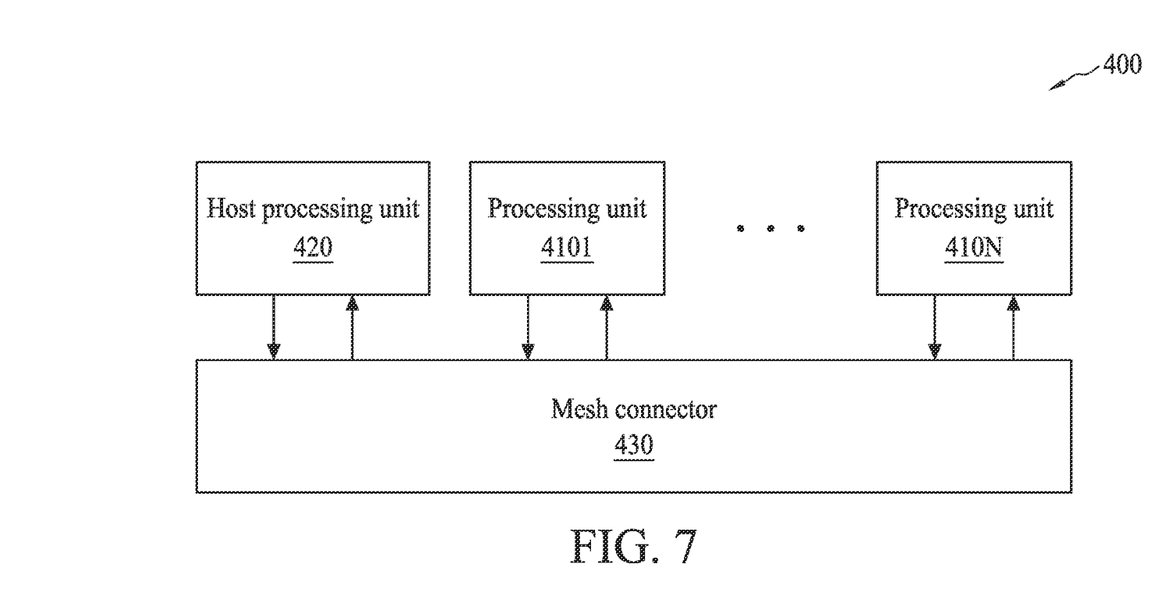
FIG. 7 is a schematic diagram illustrating a computing system according to another embodiment of the present disclosure.

Further, it should be noted that the arrangement of processing units 2101 to 2109 in FIG. 4 is an example provided for ease of illustration, and the present disclosure does not limit the arrangement of processing units 2101 to 2109. In some embodiments, processing units 2101 to 2109 may also be arranged in, for example, a 3 by 3 or other manner consistent with system requirements. Further, in some embodiments, the computing system may also connect the individual processing units via mesh connectors in order to allow the computing system to more flexibly configure the connection relationships between the processing units. FIG. 7 is a schematic diagram illustrating a computing system 400 of another embodiment of the present disclosure. The computing system 400 may include processing units 4101 to 410N, a host processing unit 420, and a mesh connector 430, where N is an integer greater than 1 and represents the number of host control units.

As shown in FIG. 7, the host processing unit 420 and processing units 4101 to 410N can be coupled to the mesh connector 430, which can be a switching device with mesh networks, so that the electrical connections between processing units 4101 to 410N can be arranged and established on demand such that each of the processing units 4101 to 410N can be connected to the corresponding processing unit through the mesh connector 430. In this way, when the computing system 400 has to be applied to a different artificial neural network model, the mesh connector 430 can be controlled to reconfigure the connections among the processing units 4101 to 410N, so that the processing units 4101 to 410N can receive the corresponding input data and output the respective computation results to the corresponding processing unit.

In the present embodiment, the computing system 400 may configure the processing units 4101 to 410N such that a plurality of processing units in the processing units 4101 to 410N work jointly to process the computations of the same layer and/or such that a single processing unit in the processing units 4101 to 410N is used to process the computations of at least one layer, thereby improving the performance and/or hardware utilization when running the artificial neural network model. For example, in some embodiments, processing units 4101 to 410N may be configured with a priority to increase operational performance if the user has a strong demand for computation performance, or in some other embodiments, processing units 4101 to 410N may be configured with a priority to increase hardware utilization if the user has a strong need for hardware utilization. However, the present disclosure does not limit the computing system 400 to a single consideration of improving operational performance or improving hardware utilization; in some embodiments, the computing system 400 may also balance hardware utilization and operational performance by appropriately configuring the internal processing units.

Figure 8:
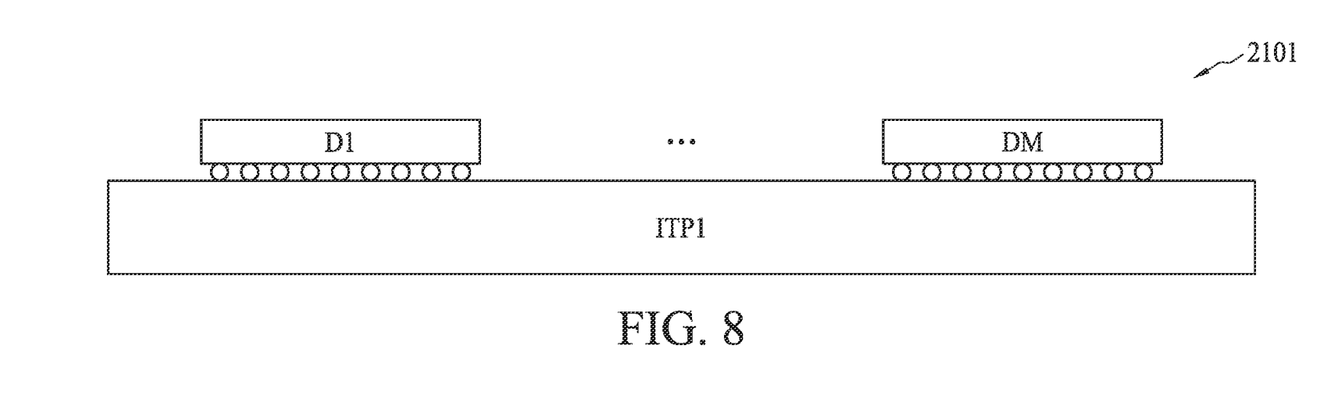
FIG. 8 is a schematic diagram illustrating the structure of the processing unit in FIG. 2.

In some embodiments, the processing units 2101 to 2109 and 4101 to 410N can be implemented using chiplets in order to make the computing systems 200 and 400 more expandable in terms of hardware design to cope with the needs of different artificial neural network model. FIG. 8 is a schematic diagram illustrating the structure of the processing unit 2101.

In FIG. 8, processing unit 2101 may include a plurality of dies D1 to DM and an interposer ITP1, where M is an integer greater than 1. The dies D1 to DM can be provided on the interposer ITP1 and can be connected correspondingly through the lines inside the interposer ITP1, so that the dies D1 to DM can be packaged together in a single chiplet. In the present embodiment, the receiving module 212A, the transmitting module 214 and the computing module 216 of the processing unit 2101 can be formed in separate dies. In addition, the processing unit 2101 may further include other memories, such as buffer storage space required for performing accumulation operations and activation functions, which in some embodiments may be static random access memories and may be formed in the corresponding die of dies D1 to DM. Because the chiplets can co-package dies with different circuit functions, each chiplet has full functionality for receiving processing and outputting of data, thereby allowing designers of computing systems 200 and 400 to easily add or remove processing units during the design and verification phases.

Furthermore, since most of the computations in the artificial neural network model require processing a large amount of data, the speed of data access is an important factor in determining the operational performance of the artificial neural network model. In the present embodiment, to improve the performance of the computing system 200, the computing modules 216 in each of the processing units 2101 to 2109 may include a near-memory computing processor in which the logic computing circuitry and the memory circuitry are arranged in adjacent to each other for co-packaging. In such case, since the logical computing circuit can access data in the memory circuit in close proximity within the chip, the operational performance of the artificial neural network model can be effectively improved. However, the present disclosure is not limited thereto, and in some other embodiments, the computational module 216 may also include other types of processors, for example, the computational module 216 may also include an in-memory computing processor with the logic computing circuitry disposed directly in the memory circuitry. Since the in-memory computing processor can directly use the data in the memory for computing operations during data reading, it can not only improve the computing efficiency but also reduce the energy consumption of data transfer.

Figure 9:
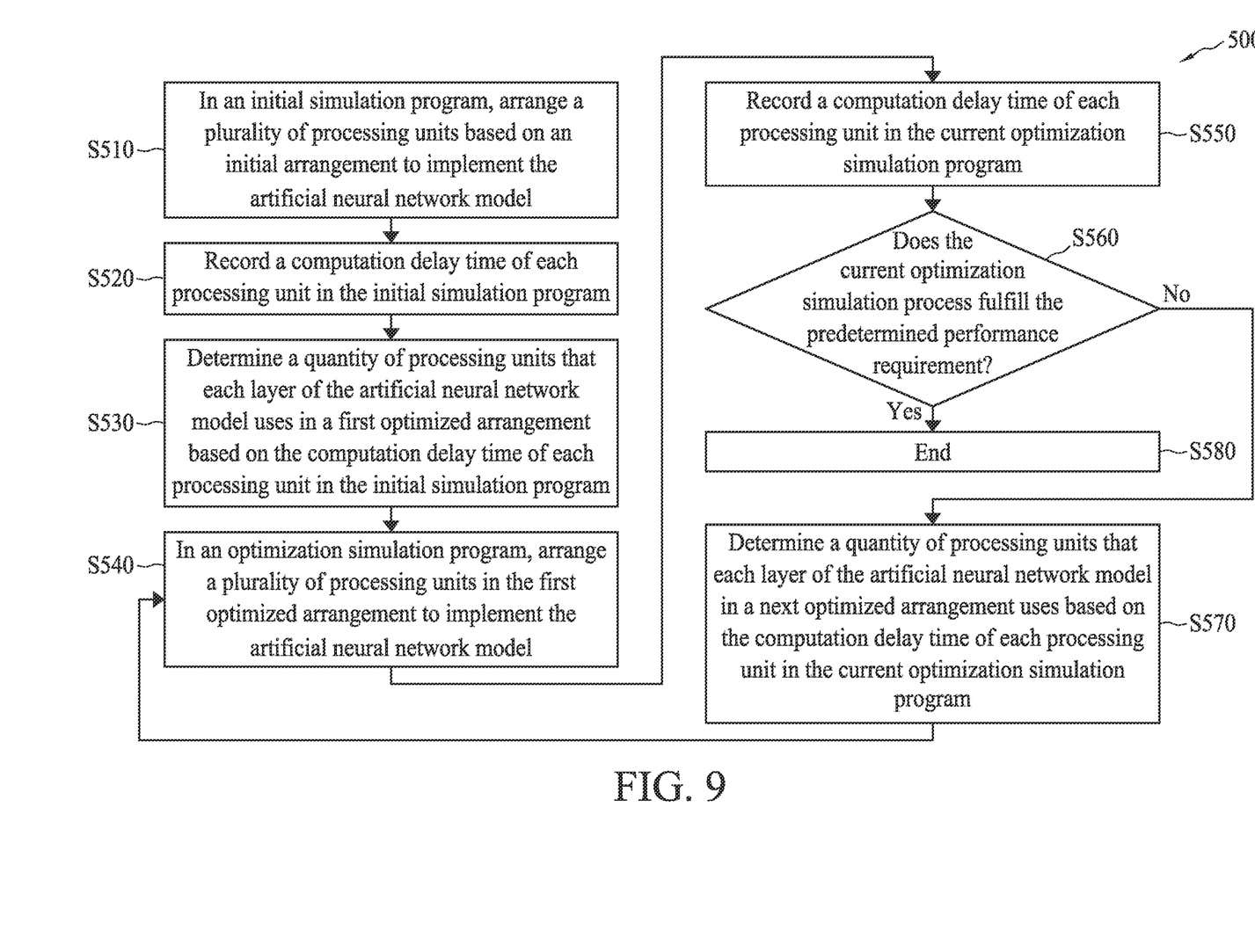
FIG. 9 is a flowchart of a method for running an artificial neural network model according to one embodiment of the present disclosure.

FIG. 9 is a flowchart illustrating a method 500 for running an artificial neural network model. The method 500 may learn the operating condition of the artificial neural network model through an initial simulation operation and reconfigure the processing units accordingly to optimize the operational effectiveness of the artificial neural network model. As shown in FIG. 9, the method 500 may include Steps S510 to S580.

In Step S510, the method 500 may arrange a plurality of processing units in the computing system 400 based on an initial arrangement to implement the artificial neural network model. In the present embodiment, the initial arrangement arranges the processing units according to Layer Wise Pipeline principles; that is, in the initial arrangement, each processing unit individually performs the computations of at least one corresponding layer in the artificial neural network model.

For example, if the artificial neural network model that the method 500 intends to implement is the eight-layer artificial neural network model of the computing system 100 in FIG.

1, then in Step S510, the processing units 4101 to 4104 are arranged based on the configurations of the processing units 1101 to 1104. That is, the processing unit 4101 is configured to process the computations of the first layer L1 of the artificial neural network model, the processing unit 4102 is configured to process the computations of the second layer L2 and the third layer L3 of the artificial neural network model, the processing unit 4103 is configured to process the computations of the fourth layer L4 to the seventh layer L7 of the artificial neural network model, and the processing unit 4104 is configured to process the computations of the eighth layer L8 of the artificial neural network model.

Next, the method 500 proceeds to Step S520, wherein a computation delay time of each of the processing units 4101 to 4104 in the initial simulation process is recorded, and then in Step S530, a quantity of processing units used by each layer of the artificial neural network model in the next round of optimized arrangement is determined based on the computation delay time of each of the processing units 4101 to 4104 in the initial simulation process, so as to improve at least one of the performance and hardware utilization when running the artificial neural network model. For example, if in Step S510, the computation delay times of the processing units 4101 to 4104 in the initial simulation process are similar to the computation delay times of the processing units 1101 to 1104 in FIG. 2, then in the next round of optimized arrangement, more processing units may be arranged to jointly process the computations of the first layer L1. Next, in Step S540, a plurality of processing units are arranged based on the optimized arrangement determined in Step S530 to implement the artificial neural network model, and perform the optimization simulation process.

For example, the step S530 may use the arrangement of the processing units 2101 to 2109 of the computing system 200 in FIG. 3 as the optimized arrangement of the computing system 400. That is, in this round of optimized arrangement, the processing units 4101 to 4104 may be used to jointly process the computations of the first layer L1 of the artificial neural network model, the processing units 4105 and 4106 may be used to jointly process the computations of the second layer L2 of the artificial neural network model, the processing unit 4107 may be used to process the computations of the third layer L3 and the fourth layer L4 of the artificial neural network model, the processing unit 4108 may be used to process the computations of the fifth layer L5 to the seventh layer L7 of the artificial neural network model, and the processing unit 4109 may be used to process the computations of the eighth layer L8 of the artificial neural network model. In such case, in Step S540, the first part TDI1A, the second part TDI1B, the third part TDI1C and the fourth part TDI1D of the input data DI1 may be generated based on the input file F1, and the processing units 4101, 4102, 4103 and 4104 may be arranged to respectively perform the computing operations of the first layer L1 based on the first part TDI1A, the second part TDI1B, the third part TDI1C and the fourth part TDI1D of the input data DI1 to generate the first part TDO1A, the second part TDO1B, the third part TDO1C and the fourth part TDO1D of the output data DO1. Moreover, the step S540 may further arrange the processing unit 4105 to perform the computing operations of the second layer L2 based on the first part TDO1A and the second part TDO1B of the output data DO1, and arrange the processing unit 4106 to perform the computing operations of the second layer L2 based on the third part TDO1C and the fourth part TDO1D of the output data DO1. Moreover, the processing units 4107, 4108 and 4109 may be arranged to process the computations of a plurality of corresponding layers.

In some embodiments, the step S550 may further record the computation delay time of each processing unit in the first optimization simulation process. In Step S560, if the current optimization simulation process cannot fulfill the predetermined performance requirement, e.g., the overall computation time of the artificial neural network model is too long or the utilization efficiency of a certain processing unit is too low, then the method further proceeds to the step S570, wherein a quantity of processing unit used by each layer of the artificial neural network model in the next round of optimized arrangement is determined based on the computation delay time of each of the processing units 4101 to 4104 in the previous optimization simulation process. Then, the step S540 is repeated, wherein the processing units are arranged based on the second optimized arrangement to run the artificial neural network model again. In this way, it is possible to continue to optimize the arrangement of the processing units to find the arrangements that best fit the requirement.

In some embodiments, if the result of the first optimization simulation process is sufficient to fulfill the performance requirement, then the first optimized arrangement can also be used as the final arrangement. Moreover, in the computing system 400, although the mesh connector 430 may provide connection lines among processing units 4101 to 410N, so that the computing system 400 is able to arrange the processing units 4101 to 410N more flexibly, using the mesh connector 430 to transmit data may result in longer delay. Therefore, in some embodiments, if it has been determined that the computing system 400 will only be used to run a certain kinds of artificial neural network models, then it is feasible to establish the arrangement and connection relationship of the processing units 4101 to 4109 based on the result of the method 500, such that the corresponding processing units are directly connected via wires, thereby replacing the mesh connector 430 (such as the computing system 200 shown in FIG. 3).

In addition, in some embodiments, to ensure that processing units 4101 to 410N can actually perform computations based on the initial arrangement, the first optimized arrangement, and the second optimized arrangement, the method 500 may further include the step of obtaining the hardware requirements for the computation of each layer and the hardware specifications for each processing unit in the artificial neural network model. For example, depending on the difference of the computation of each layer, the weighted memory capacity required for the computation of each layer and the memory capacity required to perform the activation function may be different. Although in most cases, the hardware specifications of each processing unit 4101 to 410N should be sufficient to perform the computation required for a single layer on its own, in the initial arrangement and subsequent optimized arrangements, there may be cases where a single processing unit has to complete the computations of multiple layers alone, and then it is necessary to confirm whether the hardware specifications of the single processing unit can meet the hardware requirements needed for the computations of multiple layers. In other words, in the step S530, in addition to the computation delay time of each processing unit in the initial simulation process, the optimized arrangement is further determined based on the hardware requirements for the computation of each layer and the hardware specifications of each processing unit.

In summary, the computing system and method for implementing an artificial neural network model provided by embodiments of the present disclosure can use a plurality of processing units jointly to process the computations of the same layer in the artificial neural network model or use a single processing unit to individually process the computations of multiple layers, so that the pipelining design can be more flexible, and that the computation load of each processing unit can be more even, thereby improving the performance of running the artificial neural network model.

The foregoing description briefly sets forth the features of certain embodiments of the present application so that persons having ordinary skill in the art more fully understand the various aspects of the disclosure of the present application. It will be apparent to those having ordinary skill in the art that they can easily use the disclosure of the present application as a basis for designing or modifying other processes and structures to achieve the same purposes and/or benefits as the embodiments herein. It should be understood by those having ordinary skill in the art that these equivalent implementations still fall within the spirit and scope of the disclosure of the present application and that they may be subject to various variations, substitutions, and alterations without departing from the spirit and scope of the present disclosure.

What is claimed is:

1. A computing system for implementing an artificial neural network model, the artificial neural network model having a structure of multiple layers, and output data of a first layer of the multiple layers being utilized as data required for computations of a second layer, the computing system comprising:
a first processing unit, a second processing unit, a third processing unit, and a host processing unit, and the computing system being configured to arrange the first processing unit, the second processing unit, and the third processing unit to improve performance and/or hardware utilization of the computing system when running the artificial neural network model, wherein:
the first processing unit is configured to perform computing operations of the first layer based on a first part of input data of the first layer to generate a first part of the output data;
the second processing unit is configured to perform computing operations of the first layer based on a second part of the input data of the first layer to generate a second part of the output data; and
the third processing unit is configured to perform computing operations of the second layer based on the first part and the second part of the output data;
the first processing unit, the second processing unit and the third processing unit have a same structure;
the host processing unit is configured to generate:
blocks of a feature map based on an input file;
the first part of the input data corresponding to a block of the feature map; and
the second part of the input data corresponding to a different block of the feature map.

2. The computing system of claim 1, wherein:
the first processing unit, the second processing unit and the third processing unit each comprises a near-memory computing processor or an in-memory computing processor.

3. The computing system of claim 1, wherein the artificial neural network model is a convolutional neural network model configured for image recognition, and the input file is an image to be recognized.

4. The computing system of claim 1, wherein the first processing unit, the second processing unit and the third processing unit each comprises a plurality of receiving modules and a plurality of transmitting modules.

5. The computing system of claim 4, wherein:
a first receiving module of the third processing unit is coupled to a transmitting module of the first processing unit to receive the first part to the output data; and
a second receiving module of the third processing unit is coupled to a transmitting module of the second processing unit to receive the second part of the output data.

6. The computing system of claim 1, wherein the first processing unit, the second processing unit and the third processing unit each comprises a receiving module, a transmitting module and a multiplexer.

7. The computing system of claim 6, wherein the multiplexer of the third processing unit is coupled to the transmitting module of the first processing unit and the transmitting module of the second processing unit, and is configured to transmit the first part of the output data to the receiving module of the third processing unit during a first period, and transmit the second part of the output data to the receiving module of the third processing unit during a second period different from the first period.

8. The computing system of claim 1, further comprises mesh connector, coupled to the first processing unit, the second processing unit and the third processing unit and configured to arrange and establish electric connections among the first processing unit, the second processing unit and the third processing unit.

9. The computing system of claim 1, further comprising a fourth processing unit, configured to perform computations of multiple corresponding layers of the multiple layers.

10. A method for implementing an artificial neural network model, the artificial neural network model having a structure of multiple layers, and output data of a first layer of the multiple layers being utilized as data required for computations of a second layer, the method comprising:
in an initial simulation process, arranging a plurality of processing units based on an initial arrangement to implement the artificial neural network model, wherein for the plurality of processing units in the initial arrangement, each processing unit performs computation of at least one corresponding layer of the artificial neural network model individually;
recording a computation delay time of each processing unit in the initial simulation process,
determining a quantity of processing units that each layer of the artificial neural network model uses in a first optimized arrangement at least based on the computation delay time of each processing unit in the initial simulation process, to improve performance and/or hardware utilization when running the artificial neural network model; and
in a first optimization simulation process, arranging a plurality of processing units in the first optimized arrangement to implement the artificial neural network model.

11. The method of claim 10, wherein in the first optimization simulation process, the arranging of the plurality of processing units in the first optimized arrangement to implement the artificial neural network model comprises:
arranging a first processing unit to perform computing operations of a first layer based on a first part of input data of the first layer of the multiple layers to generate a first part of the output data;

arranging a second processing unit to perform computing operations of the first layer based on a second part of the input data to generate a second part of the output data; and arranging a third processing unit to perform computing operations of the second layer based on the first part and the second part of the output data.

12. The method of claim 11, further comprising:
generating the first part and the second part of the input data based on an input file of the artificial neural network model.

13. The method of claim 12, wherein:
the artificial neural network model is a convolutional neural network model for image recognition, and the input file comprises an image to be recognized;
the generating of the first part and the second part of the input data based on the input file of the artificial neural network model comprises:
generating a feature map of the input file based on the input file; and
partitioning the feature map such that a first block of the feature map is used as the first part of the input data and a second block of the feature map is used as the second part of the input data.

14. The method of claim 10, wherein in the first optimization simulation process, the arranging of the plurality of processing units in the first optimized arrangement to implement the artificial neural network model comprises:
arranging a fourth processing unit to perform computations of multiple corresponding layers of the artificial neural network model.

15. The method of claim 10, further comprising:
recording a computation delay time of each processing unit in the first optimization simulation process, and
determining a quantity of processing units that each layer of the artificial neural network model in a second optimized arrangement uses at least based on the computation delay time of each processing unit in the first optimization simulation process; and
in a second optimization simulation process, arranging a plurality of processing units in the second optimized arrangement to implement the artificial neural network model.

16. The method of claim 10, wherein:
the plurality of processing units based on the initial arrangement each comprises a near-memory computing processor or an in-memory computing processor.

17. The method of claim 10, wherein the artificial neural network model is applied in information retrieval, speech technology, natural language processing, deep learning, image content analysis or video content analysis.

18. The method of claim 10, further comprising:
obtaining a hardware requirement for computations of each layer of the artificial neural network model and a hardware specification of each processing unit;
wherein the determining of the quantity of processing units that each layer of the artificial neural network model in the first optimized arrangement uses at least based on the computation delay time of each processing unit in the initial simulation process comprises determining the quantity of processing unit that each layer of the artificial neural network model uses in the first optimized arrangement based on the computation delay time of each processing unit in the initial simulation process, the hardware requirement for the computations of each layer and the hardware specification of each processing unit.

19. The method of claim 18, wherein
the hardware requirement for the computations of each layer comprises memory capacity required for weighting values of the computations of each layer and memory capacity required for executing an activation function of the computations of each layer.

20. A computing system for implementing an artificial neural network model having multiple layers comprising first and second layers, first layer input data being provided as input for computations of the first layer to generate first layer output data, the first layer output data being used for computations of the second layer, and the computing system comprising:
first and second processing units configured to jointly perform computing operations of the first layer in parallel, wherein:
the first processing unit is configured to generate a first portion of the first layer output data based on a first portion of the first layer input data;
the second processing unit is configured to generate a second portion of the first layer output data in parallel to the first portion of the first layer output data based on a second portion of the first layer input data; and
the second processing unit comprises a structure that is same as a structure of the first processing unit; and
a third processing unit configured to perform the computing operations of the second layer using the first and second portions of the first layer output data as input, the third processing unit comprising a structure same as the structures of the first and second processing units,
wherein the computing system is configured to arrange the first processing unit, the second processing unit, and the third processing unit to improve performance and/or hardware utilization of the computing system when running the artificial neural network model.

* * * * *